United States Patent
Delons et al.

(10) Patent No.: US 6,929,786 B2
(45) Date of Patent: Aug. 16, 2005

(54) METHOD FOR SEPARATING ZIRCONIUM AND HAFNIUM TETRACHLORIDES WITH THE AID OF A MELTED SOLVENT

(75) Inventors: Laurence Delons, Saint Martin D'Heres (FR); Gérard Picard, Fontenay sous Bois (FR); Delphine Tigreat, Antibes (FR)

(73) Assignee: Compagnie Europeenne du Zirconium CEZUS, Courbevoie (FR)

( * ) Notice: Subject to any disclaimer, the term of this patent is extended or adjusted under 35 U.S.C. 154(b) by 174 days.

(21) Appl. No.: 10/311,489

(22) PCT Filed: Apr. 12, 2002

(86) PCT No.: PCT/FR02/01292
§ 371 (c)(1),
(2), (4) Date: Apr. 25, 2003

(87) PCT Pub. No.: WO02/083960
PCT Pub. Date: Oct. 24, 2002

(65) Prior Publication Data
US 2003/0165419 A1 Sep. 4, 2003

(30) Foreign Application Priority Data
Apr. 18, 2001 (FR) .............................. 01 05262

(51) Int. Cl.⁷ ............................................. C22B 34/14
(52) U.S. Cl. ............................. 423/73; 423/76; 423/84; 423/DIG. 12; 423/210.5; 423/492
(58) Field of Search ............................ 423/492, 73, 76, 423/84, 210.5, DIG. 12

(56) References Cited

U.S. PATENT DOCUMENTS

| | | | |
|---|---|---|---|
| 1,582,860 A | | 4/1926 | De Boer et al. |
| 2,816,814 A | | 12/1957 | Plucknett et al. |
| 2,928,722 A | | 3/1960 | Scheller |
| 3,671,186 A | | 6/1972 | Ishizuka |
| 3,734,689 A | * | 5/1973 | Larsen et al. .................. 423/71 |
| 3,966,458 A | * | 6/1976 | Spink ........................... 75/618 |
| 4,021,531 A | | 5/1977 | Besson et al. |
| 4,737,244 A | | 4/1988 | McLaughlin et al. |
| 4,749,448 A | | 6/1988 | Stoltz et al. |
| 4,865,695 A | * | 9/1989 | Snyder et al. ................ 203/29 |
| 4,874,475 A | | 10/1989 | McLaughlin et al. |
| 4,913,778 A | * | 4/1990 | Lee et al. ...................... 203/29 |
| 4,917,773 A | * | 4/1990 | Brun et al. .................... 203/50 |
| 4,923,577 A | * | 5/1990 | McLaughlin et al. ....... 205/397 |
| 4,923,579 A | * | 5/1990 | Snyder et al. .............. 205/370 |
| 5,009,751 A | * | 4/1991 | Kirihara et al. ............. 205/498 |

FOREIGN PATENT DOCUMENTS

| | | |
|---|---|---|
| FR | 1 537 218 | 11/1966 |
| FR | 2 250 707 | 6/1975 |
| FR | 2 543 162 | 3/1983 |

OTHER PUBLICATIONS

Tricot R: "Metallurgie, Proprietes Et Emploi Du Hafnium" Memoires Et Etudes Scientifiques De La Revue De Metallurgie, Revue De Metallurgie. Paris, FR, vol. 88, No. 11. Nov. 1, 1991, pp. 747–759, XP000278165 ISSN: 0245–8292 p. 751; figure 1*.

* cited by examiner

Primary Examiner—Ngoc-Yen Nguyen
(74) Attorney, Agent, or Firm—Kenyon & Kenyon

(57) ABSTRACT

A method of separating zirconium and hafnium tetrachlorides using a solvent comprising firstly an alkaline metallic solvent comprising a salt made up of an alkali metal chloride and an acidic metal chloride A, for example a chloroaluminate or an alkaline chloroferrate, and secondly an acidic metal or metalloid chloride B of acidity that is less than that of the acidic metal chloride A. The acidic metal or metalloid chloride B may be selected from chlorides of Mg, Zn, and Cu. The method may be a continuous separation method by selective absorption of the tetrachloride vapors by the solvent in the substantially or totally molten state.

23 Claims, 1 Drawing Sheet

US 6,929,786 B2

METHOD FOR SEPARATING ZIRCONIUM AND HAFNIUM TETRACHLORIDES WITH THE AID OF A MELTED SOLVENT

FIELD OF INVENTION

The present invention relates to a method of separating zirconium and hafnium by extractive distillation using molten salts.

BACKGROUND INFORMATION

Zirconium possesses a very small neutron capture section, and that is why it is used in nuclear reactors. The mineral zircon nevertheless always contains hafnium, at a concentration of about 1% to 3% by weight. Unlike zirconium, hafnium absorbs neutrons strongly and will therefore greatly reduce neutron flux in a nuclear reactor. The use of zirconium in the nuclear field thus requires prior elimination of hafnium, and a content of less than 100 parts per million (ppm) is often recommended.

Hafnium and zirconium have properties that are very similar which makes separating them extremely difficult. Various techniques have been proposed and used. At present, only a few methods have been accepted and applied on an industrial scale. One such method is multiple crystallization of potassium and zirconium fluoride, another is liquid—liquid extraction using various organic solvents, e.g. TBP in an acid medium (nitric acid), n-octylamine in an acid medium (sulfuric acid), methyl isobutyl ketone (MIBK), and finally there is the method of chloride distillation (D. Sathiyamoorthy et al., High temperature materials and processes 1999, Vol. 18, No. 4, 213–226).

Conventionally, prior to performing extractive distillation and certain liquid—liquid extraction techniques, the mineral is subjected to carbochloration which produces the tetrachlorides $ZrCl_4$ and $HfCl_4$. In liquid—liquid extraction, the chlorides need to be put into aqueous solution and extraction leads to the formation of $ZrO_2$ and $HfO_2$, which then requires further carbochloration of the zirconium prior to moving on to the stage of recovering metallic Zr.

The method by extractive distillation uses a distillation column having a plurality of trays each supporting a layer of molten salts. The chlorides are introduced in the gaseous state. $ZrCl_4$ is recovered in the solvent at the bottom of the column. $HfCl_4$ is entrained with the gas to the top of the column. Various solvents have been proposed: sodium chlorozirconate and chlorohafnate in FR-A-1 537 218; phosphorus oxichloride in U.S. Pat. No. 1,582,860; pure zinc chloride; anhydrous tin chloride in U.S. Pat. No. 2,816,814; alkali metal chloride+aluminum or iron chloride in U.S. Pat. No. 2,928,722; sodium chloride in U.S. Pat. No. 3,671,186; alkaline chloroaluminate or chlorferrate in FR-A-2 250 707 (U.S. Pat. No. 4,021,531), FR-A-2 543 162; sodium and potassium chlorides U.S. Pat. No. 3,966,458; zinc chloride and lead chloride in U.S. Pat. No. 4,737,244; zinc chloride+ calcium or magnesium chloride in U.S. Pat. No. 4,749,448; and lithium chloride+at least one chloride selected from those of sodium, potassium, magnesium, and calcium in U.S. Pat. No. 4,874,475.

Those various separation techniques present their advantages and their drawbacks. It is mentioned above that liquid—liquid extraction requires steps of putting chlorides into solution and a second carbochloration step. The solvent MIBK is volatile and highly explosive, which gives rise to problems with handling and reprocessing effluents, but nevertheless a significant fraction of worldwide Zr production is based on that technique. The solvent TBP turns out to provide lower performance and to be more expensive, which explains why it has been abandoned progressively. See A. B. V. da Silva, Jr. and P. A. Distin in CIM Bulletin 1998, Vol. 91, No. 1018, 221–224.

A drawback of extractive distillation results from the fact that the looked-for metal, i.e. Zr, is in the solvent which means that it must subsequently be recovered therefrom and thus that additional steps need to be performed, which gives rise to non-negligible costs. According to da Silva and Distin supra, the main drawbacks of that technique are its poor separation factor which requires a very large number of stages (about 90), and the highly corrosive nature of the solvents and the constraints associated with using vapor streams, which also has an impact on the materials that can be implemented. Still according to those authors, the cost of an installation operating with that method is therefore high, and that ought to constitute a brake on its use for new installations. Finally, that document concludes that the future lies more with liquid—liquid extraction using new aqueous solvents.

SUMMARY

Going against the teaching of the previous documents, the present application improves the productivity, i.e. the separation efficiency of the method of extractive distillation in molten salts, which improvement can also be applied to existing distillation installations.

As a result, the present application has found that by using novel solvents, the efficiency of separation is increased. It is also to be observed that it is possible to invert the separation process and recover a Zr-enriched gas from the top of the column. It is also possible to work at a temperature that is lower than the temperature usually recommended, and even to further increase the separation factor since it increases inversely with temperature. This gives rise to considerable consequences. It is possible to lighten the additional steps of recovery downstream from distillation. It is also possible to reduce the number of distillation stages. This also has a major incidence on reducing the cost of operating existing installations and on the costs of installing and running new units. Other advantages are mentioned below.

According to the present invention, these objects and results are achieved by a method of continuously separating zirconium and hafnium tetrachlorides by selective absorption of their vapors by a molten solvent (substantially or totally molten) flowing as a countercurrent to said vapors in a distillation column, said molten solvent comprising at least an alkaline metallic solvent of the type commonly used in extractive distillation of zirconium, i.e. at least a salt made up of an alkali metal chloride and an acidic metal chloride A, such as $AlCl_3$ or $FeCl_3$ (which gives an alkaline chloroaluminate or chloroferrate). This "base" solvent has added thereto one or more acidic metal or metalloid chlorides B that are weaker than those making up the composition of said "base" solvent, thus leading to a molten salt that is at least ternary.

By definition, a chloride is said to be "acid" if it is capable of bonding with $Cl^-$ ions. The term "weaker" when speaking of the acidity of the metal chloride B means that the element bonded to chlorine in the acidic metal (or metalloid) chloride B has lower affinity for $Cl^-$ ions than does the element bonded to chlorine in the acidic metal chloride A. The acidity of the chloride or of a mixture of chlorides, i.e. its pCl defined by $pCl=\log[Cl^-]$, may be determined in simple manner by measuring the free potential of the chloride or of the mixture. It suffices to measure it on an aluminum wire and relative to a reference electrode made up of an aluminum wire dipped in a KCl-saturated mixture of $AlCl_3$-KCl. The pCl is obtained by the formula:

$$E=E_0-(4RT/3F)\ln[Cl^-]$$

where:

$E_0$=the free potential of the chloride or the mixture of chlorides;

R is a constant=8.314;

T=temperature in Kelvins;

F=Faraday's constant;

$\ln[Cl^-]$=the natural logarithm of the $Cl^-$ ion concentration.

The acidic metal or metalloid chlorides B are selected in particular from chlorides of alkaline earths (e.g. Mg), chlorides of transition metals (e.g. Zn, Cu, Ni, Co, and possibly Fe or certain metalloids such as Pb and Sn. The acidic metal chlorides B may have oxidation degree II. Advantageously, they also possesses a coordination number of 4 in the mixture. It may be magnesium chloride $MgCl_2$ and/or zinc chloride $ZnCl_2$.

The present invention sets out to be applied to solvents made up of an alkali metal chloride and an acidic metal chloride (metalloid chloride or transition metal chloride) e.g. chloroaluminates or chloroferrates, while nevertheless not being limited thereto. More particularly, in the "base" solvent, the alkali metal chloride may comprise as its metal Li, Na, K, or Cs. KCl and NaCl may be used. The acidic metal chloride A and the acidic metal or metalloid chloride B are selected so as to satisfy the above-specified rule of weaker acidity for B/A. The acidic metal chloride A may be $AlCl_3$ and/or $FeCl_3$. The following combinations $AlCl_3$+KCl and/or $FeCl_3$+NaCl may be used as the base solvent. It is possible to use $AlCl_3$ in the base solvent and an iron chloride as the acidic metal or metalloid chloride B. Under such circumstances, the iron chloride may be $FeCl_2$.

In example implementations of the invention, the following apply:

base solvent:

$AlCl_3$ and/or $FeCl_3$ as the acidic metal chloride A and preferably with KCl and/or NaCl as the alkali metal chloride; such as, for example, $AlCl_3$+KCl and/or $FeCl_3$+NaCl; and acidic metal chloride B:

$MgCl_2$ and/or $ZnCl_2$ and/or $CuCl_2$, and $MgCl_2$ and/or $ZnCl_2$ for example.

The molar ratio of acidic metal chloride A (e.g. aluminum chloride and/or ferric chloride) may lie in the range 0.7 to 1.3. It may also lie in a narrower range of 0.8 to 1.

The molar ratio of acidic metal or metalloid chloride B over acidic metal chloride A (e.g. aluminum chloride and/or ferric chloride) may lie in the range 0.01 to 1.5, and in the narrower range of 0.1 to 0.3.

The method may be conducted in particular at a temperature lying in the range about 250° C. to about 550° C. Nevertheless, it is more efficient to work in the lower portion of the range. Separation efficiency increases inversely with temperature. According to a feature of the invention, the temperature lies in the range about 250° C. to about 350° C. The lower limit of the temperature range is selected so that the solvent is substantially molten, or completely molten, and in some cases, e.g. for certain solvents, it may even be less than 250° C. These low temperatures confer two considerable advantages on the method. They make it possible to reduce energy expenditure to a great extent, which expenditure is already reduced because it is possible to reduce the number of trays for given separation efficiency compared with other methods. Equipment corrosion is also greatly reduced, and this is extremely favorable from the point of view of the cost of the installation and the cost of maintenance.

Distillation is generally performed at atmospheric pressure.

The present invention also provides use of a solvent comprising at least one base alkaline metallic solvent as described herein and at least one acidic metal solvent B as described herein, such as substantially or totally molten, for the purpose of separating zirconium and hafnium tetrachlorides. This use is not limited to the molten salt distillation described above, but can cover any other method enabling zirconium and hafnium tetrachlorides to be separated. Zirconium and hafnium tetrachloride vapor is put into contact with the solvent of the invention, and the tetrachlorides are separated because of the different affinities of the solvent for the tetrachlorides.

According to an additional feature, the method and the use of the invention seek to enrich the vapor at the top of the column in zirconium tetrachloride and thus to recover the gas from the top of the column.

BRIEF DESCRIPTION OF THE DRAWINGS

The invention is described below in greater detail with reference to embodiments taken as non-limiting examples, and with reference to the accompanying drawings.

DETAILED DESCRIPTION

Figure 1:
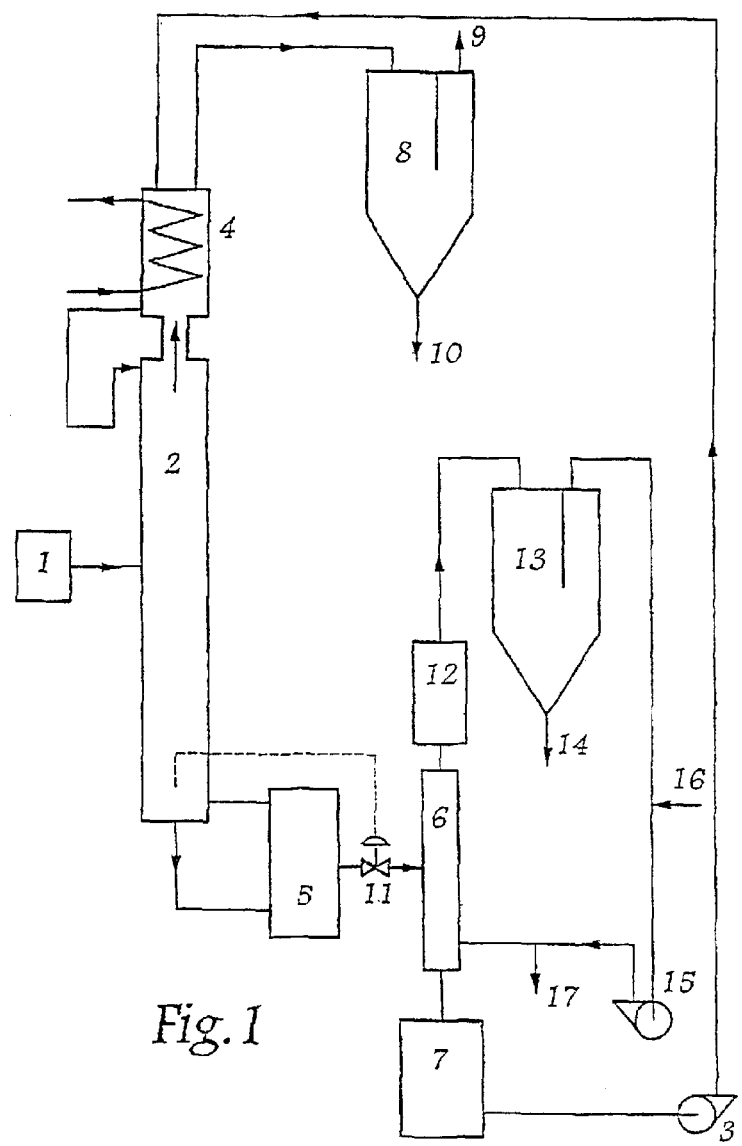
FIG. 1 is a diagram of a separator installation enabling the method of the invention to be implemented.

The installation comprises an arrangement 1 for feeding a distillation column 2 with raw zirconium tetrachloride vapor that also contains hafnium tetrachloride. A pump 3 circulates the extraction solvent of the invention downwards along the distillation column as a countercurrent to the flow of zirconium and hafnium tetrachloride vapors. The solvent travels in a closed circuit via the condenser absorber 4, the column 2, the boiler 5, the stripping column 6, and the tank 7, from which it is returned by the pump 3 to the condenser absorber 4.

By way of example, the solvent may be a mixture of $AlCl_3$/KCl and of $MgCl_2$, having the following molar ratios:

0.7<Al/K<1.3 e.g. 0.8<Al/K<1

0.01<Mg/Al<1.5 e.g. 0.1<Mg/Al<0.3

The vapors enriched in zirconium tetrachloride on rising up the column 2 by exchange with the solvent flowing as a countercurrent leave the column 2 from the top thereof, and then passes through the condenser absorber 4 in which the vapors saturate the solvent. A fraction of the vapors that is not retained by the solvent separates from the condenser absorber 4 and condenses in the condenser 8 which is connected to the atmosphere via a vent 9, and has a drawing-off arrangement 10 for drawing-off the condensate that is enriched in zirconium tetrachloride.

At the bottom of the column 2, the boiler 5 of temperature adjusted to lie in the range 250° C. to 550° C., and or for example in the range 250° C. to 350° C. receives the hafnium tetrachloride solution in the solvent which is depleted in zirconium tetrachloride as it travels down the column 2. This solution passes from the boiler 5 into the stripping column 6 via a flow rate control valve 11 which is controlled so as to maintain a substantially constant level of solvent at the bottom of the column 2. In the stripping column 6, the hafnium tetrachloride depleted in zirconium tetrachloride is extracted from the solvent by a flow of inert gas, such as nitrogen, flowing up the column at a counter-current to the solvent, and entraining at the top thereof the hafnium tetrachloride vapors which are thus extracted from the solvent. These vapors containing a residue of $AlCl_3$ are entrained by the inert gas flow through a device 12 for eliminating aluminum, e.g. as described in FR-A-2 543 162. At the outlet from the device 12, the hafnium tetrachloride vapors are entrained into the condenser 13 and the purified hafnium tetrachloride is drawn off at 14. The inert gas is entrained around a closed circuit by the booster pump 15, losses being compensated by introducing inert gas at 16 and any excess pressure being limited by a valve 17. The inert gas may be nitrogen or other gas that does not react with the compounds or materials used. Also, instead of causing the inert gas to circulate, it is possible to encourage hafnium tetrachloride vapor to be given off in the column 6 and to pass through the device 12 by reducing the pressure inside the condenser 13 by a vacuum pump.

The use of a solvent in accordance with the invention in such an installation makes it possible to extract zirconium tetrachloride in the gaseous state from the top of the column, which gas may be recovered directly without the usual steps of stripping and eliminating aluminum as are required when the zirconium tetrachloride is entrained by the solvent as in the prior art. This installation thus enables the zirconium tetrachloride to be purified to as great as extent as desired while using a smaller number of trays than in the cited references. The residual hafnium tetrachloride content depends on the number of trays in the column and on the settings of operating conditions. In practice, it is thus possible to use a column that has fewer trays. In addition, the optimum temperature range is lower than in the cited reference, thus making it possible to limit problems of the equipment corroding and to greatly reduce the amount of energy that is expended.

The installation also serves to recover hafnium tetrachloride which may be made use of in turn.

This exemplary embodiment compares separation efficiency as a function of the composition of the molten solvent. Two solvents of the invention are compared with each other and also with previous citation solvents from which they differ by the additional presence of the acidic chloride. The device used for comparison purposes, as described below, is substantially equivalent to one tray in the column.

All of the solvents used in this example are based on an alkaline chloroaluminate formed of aluminum chloride $AlCl_3$ and potassium chloride KCl in the ratios specified in the table below.

Solvent 1 does not have any acidic chloride B, unlike solvents 2, 3, and 4 in accordance with the invention. In this case, the acidic chloride B is magnesium chloride $MgCl_2$ and the molar ratios Mg/Al are given in the table below.

Figure 2:
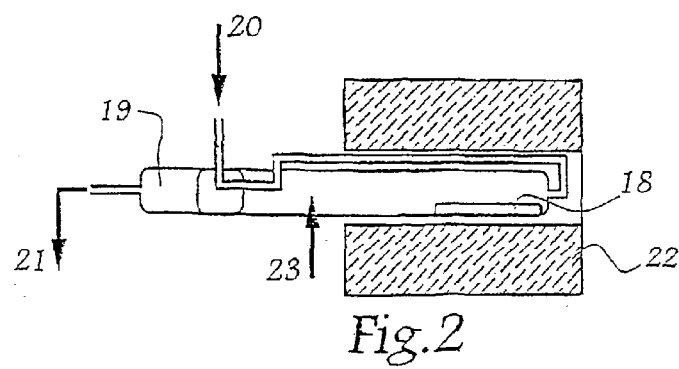
FIG. 2 is a diagram of a laboratory device enabling the operation of the method of the invention to be investigated.

The mixtures of solvent and zirconium tetrachloride+hafnium tetrachloride were prepared in a glove box. They were then placed in a boat 18 inserted into a long silica reactor 19 (see FIG. 2). The assembly was placed under a flow of argon (inlet at 20 outlet at 21) and introduced into a tubular oven 22 previously raised to the selected temperature. A portion of the reactor 19 was kept outside the oven 22 to constitute a cold point symbolized at 23 where vapors condensed. After one hour at high temperature, the condensate and the residual remaining in the boat 1B were recovered and analyzed by inductively coupled plasma emission spectroscopy (ICP).

|  | Al/K | Mg/Al | pCl | Zr/Hf initial (a) | Zr/Hf condensate | (b) | Enrichment[1] |
|---|---|---|---|---|---|---|---|
| solvent 1 | 1.04 | 0 | ≈4.8 | 20 | T = 350° C. | 17 | 1/1.18 |
| solvent 2 | 0.869 | 0.21 | 2.2 < pCl < 2.8 | 20 | T = 250° C. | 45 | 2.25 |
|  |  |  |  |  | T = 340° | 32 | 1.60 |
|  |  |  |  |  | T = 350° | 25 | 1.25 |
| solvent 3 | 0.872 | 0.21 | 2.6 < pCl < 3.5 | 20 | T = 350° C. | 39 | 1.95 |
| solvent 4 | 1.07 | 0.21 | 3.1 < pCl < 4 | 20 | T = 250° C. | 29 | 1.45 |
|  |  |  |  |  | T = 340° C. | 27 | 1.35 |
|  |  |  |  |  | T = 350° C. | 24 | 1.20 |

[1]Zr enrichment of the vapor = (b)/(a).

The results in the Zr/Hf column for the condensate show increased separation efficiency when using solvents of the invention compared with previous method solvents that do not contain acidic chloride other than those in the "base-"solvent.

The results of the table also show how separation is inverted using the solvents of the invention. It can be seen that separation efficiency increases with decreasing temperature.

Separation efficiency is at its maximum at 250° C. for a solvent of type 2. A tray enables the zirconium tetrachloride rich phase to be enriched by 2.25 times, whereas without magnesium chloride, the degree of enrichment is only 1.18 times. Fewer trays are therefore required to reduce the hafnium content of the raw zirconium tetrachloride from 3% for example (mean content in zircon mineral) to 100 ppm or even less (a concentration that is generally accepted in the nuclear industry). Since the solvent 2 is not entirely molten at 250° C., it is possible to operate and at a temperature that is slightly higher, e.g. in the range 300° C. to 350° C. Separation continues to be highly efficient.

It should naturally be understood that the invention defined by the accompanying claims is not limited to the particular implementations described in the description above, but covers variants that do not go beyond the ambit or the spirit of the present invention.

What is claimed is:

1. A method of continuously separating tetrachlorides of zirconium and hafnium comprising:

performing selective absorption of vapors of the zirconium and the hafnium by a solvent that is one of substantially and totally molten and flowing as a countercurrent to the vapors in a distillation column, wherein the molten solvent comprises firstly an alkaline metallic solvent comprising a salt made up of an alkali metal chloride and an acidic metal chloride A, and secondly one of an acidic metal and metalloid chloride B of acidity that is lower than that of the acidic metal chloride A.

2. The method according to claim 1, wherein the molten solvent comprises one of an alkaline chloroaluminate, chloroferrate and a mixture thereof, and one of an acidic metal and metalloid chloride B.

3. The method according to claim 1, wherein one of the acidic metal and metalloid chloride B comprises at least one of a chloride of an alkaline earth and of a transition metal and of a metalloid.

4. The method according to claim 3, wherein one of the acidic metal and metalloid chloride B has a degree of oxidation equal to 2.

5. The method according to claim 3, wherein the metal is selected from the group consisting of Mg, Zn, Cu, Ni, Co, Fe, Pb, and Sn.

6. The method according to claim 3, wherein one of the acidic metal and metalloid chloride B is at least one of magnesium chloride and a zinc chloride.

7. The method according to claim 1, wherein the alkali metal chloride in the alkaline solvent comprises one of Li, Na, K and Cs as its metal.

8. The method according to claim 1, wherein the acidic metal chloride A in the alkaline solvent comprises at least one of $AlCl_3$ and $FeCl_3$.

9. The method according to claim 1, wherein the alkaline solvent comprises at least one of $AlCl_3+KCl$ and $FeCl_3+NaCl$.

10. The method according to claim 1, wherein in the alkaline solvent, a molar ratio of the acidic metal chloride A over the alkali metal chloride lies in a range of 0.7 to 1.3.

11. The method according to claim 1, wherein a molar ratio of one of the acidic metal and the metalloid chloride B over the acidic metal chloride A lies in a range 0.01 to 1.5.

12. The method according to claim 1, wherein the method is conducted at a temperature lying in a range about 250° C. to about 550° C.

13. The use of a solvent as described in claim 1, for separating zirconium and hafnium tetrachlorides.

14. A use according to claim 13, wherein the solvent is used is one of partially, substantially and totally molten.

15. The method according to claim 4, wherein the one of the acidicmetal and the metalloid chloride B has a coordination number of 4.

16. The method according to claim 3, wherein the metal is selected from the group consisting of Mg, Zn and Cu.

17. The method according to claim 1, wherein the alkali metal chloride in the alkaline solvent comprises one of K and Na.

18. The method according to claim 1, wherein in the alkaline solvent, a molar ratio of the acidic metal chloride A over the alkali metal chloride lies in a range of 0.8 to 1.0.

19. The method according to claim 1, wherein a molar ratio of one of the acidic metal and the metalloid chloride B over the acidic metal chloride A lies in a range of 0.1 to 0.3.

20. The method according to claim 1, wherein the method is conducted at a temperature lying in a range of about 250° C. to about 350° C.

21. A method of using a solvent comprising:
   selectively absorbing vapors of zirconium and hafnium by the solvent flowing as a countercurrent to the vapors in a distillation column, wherein solvent comprises
   firstly an alkaline metallic solvent comprising a salt made up of an alkali metal chloride and an acidic metal chloride A, and secondly one of an acidic metal and metalloid chloride B of acidity that is lower than that of the acidic metal chloride A.

22. The method according to claim 21, wherein the solvent is one of partially, substantially and totally molten.

23. The method of claim 1, wherein zirconium tetrachloride is recovered from a gaseous phase at a top of the column.

* * * * *

UNITED STATES PATENT AND TRADEMARK OFFICE
CERTIFICATE OF CORRECTION

PATENT NO. : 6,929,786 B2
DATED : August 16, 2005
INVENTOR(S) : Delons et al.

It is certified that error appears in the above-identified patent and that said Letters Patent is hereby corrected as shown below:

Column 1,
Line 53, change "chlorferrate" to -- chloroferrate --.

Column 3,
Line 21, change "possesses" to -- possess --.

Column 8,
Line 9, change "acidecmetal" to -- acidic metal --.

Signed and Sealed this

Twenty-fourth Day of January, 2006

JON W. DUDAS
*Director of the United States Patent and Trademark Office*